(12) United States Patent
Salter et al.

(10) Patent No.: US 9,688,189 B1
(45) Date of Patent: Jun. 27, 2017

(54) ILLUMINATED LICENSE PLATE

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/065,220

(22) Filed: Mar. 9, 2016

(51) Int. Cl.
*B60Q 1/56* (2006.01)
*B60R 13/10* (2006.01)

(52) U.S. Cl.
CPC ............ *B60Q 1/56* (2013.01); *B60R 13/10* (2013.01)

(58) Field of Classification Search
CPC .......... B60Q 1/56; B60R 13/10; B60R 13/105
USPC .................................. 362/497–499, 509–511
See application file for complete search history.

(56) References Cited

U.S. PATENT DOCUMENTS

| | | | |
|---|---|---|---|
| 2,430,232 A | 11/1947 | Lynch | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,419,854 B1 | 7/2002 | Yocom et al. | |
| 6,471,379 B2 * | 10/2002 | Bucher | B60Q 1/56 362/497 |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,874,922 B2 | 4/2005 | Matsuura et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,163,322 B2 * | 1/2007 | Tatewaki | B60Q 1/2696 362/497 |

(Continued)

FOREIGN PATENT DOCUMENTS

| CN | 2752106 | 8/2004 |
|---|---|---|
| CN | 1651547 A | 1/2005 |

(Continued)

*Primary Examiner* — Jason Moon Han
(74) *Attorney, Agent, or Firm* — Jason Rogers; Price Heneveld LLP (57) ABSTRACT

A vehicle is provided that includes a license plate positioned on a rear of the vehicle, the license plate includes indicia with a first phosphorescent material. A light source is configured to activate the first phosphorescent material and a license plate frame at least partially surrounding the license plate. The license plate frame has an at least partially transparent substrate including a partially transmissive coating. A second phosphorescent material is positioned proximate the partially transmissive coating. The license plate frame also includes a reflective surface and a transparent surface positioned proximate the license plate.

19 Claims, 4 Drawing Sheets

(56) References Cited

U.S. PATENT DOCUMENTS

| | | | |
|---|---|---|---|
| 7,213,923 B2 | 5/2007 | Liu et al. | |
| 7,213,962 B2 * | 5/2007 | Chen | G02B 6/0021 362/23.01 |
| 7,216,997 B2 | 5/2007 | Anderson, Jr. | |
| 7,222,998 B2 * | 5/2007 | Katase | B60Q 1/56 362/497 |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,262,269 B2 * | 9/2012 | Koizumi | B60Q 1/56 362/244 |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2007/0006493 A1 * | 1/2007 | Eberwein | B60R 13/10 40/204 |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201169230 Y | 12/2008 |
| CN | 101337492 A | 1/2009 |
| CN | 201193011 Y | 2/2009 |
| CN | 201597529 U | 2/2010 |
| CN | 102463936 A | 11/2010 |
| CN | 202200922 U | 8/2011 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

ILLUMINATED LICENSE PLATE

FIELD OF THE INVENTION

The present invention generally relates to vehicle lighting systems and more particularly relates to vehicle lighting systems employing phosphorescent structures.

BACKGROUND OF THE INVENTION

Illumination arising from the use of phosphorescent structures offers a unique and attractive viewing experience. It is therefore desired to implement such structures in automotive vehicles for various lighting applications.

SUMMARY OF THE INVENTION

According to one aspect of the present invention, a vehicle is provided that includes a license plate positioned on a rear of the vehicle, the license plate includes indicia with a first phosphorescent material. A light source is configured to activate the first phosphorescent material and a license plate frame at least partially surrounding the license plate. The license plate frame has an at least partially transparent substrate including a partially transmissive coating. A second phosphorescent material is positioned proximate the partially transmissive coating. The license plate frame also includes a reflective surface and a transparent surface positioned proximate the license plate.

According to another aspect of the present invention, a vehicle is provided that includes a license plate positioned on a rear of the vehicle and a license plate frame positioned proximate the license plate. The license plate frame has a substrate with a partially transmissive surface, a phosphorescent material disposed within the substrate, a reflective surface positioned on the substrate, and a transparent surface positioned proximate the license plate. The transparent surface is configured to edge illuminate the license plate.

According to another aspect of the present invention, a frame is provided that includes a substrate including an at least semi-transparent polymeric material having a phosphorescent material disposed therein, a partially transmissive coating on at least a portion of the substrate, a reflective coating on at least a portion of the substrate, and a transparent surface of the substrate. The transparent surface is positioned on an inboard edge of the substrate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items. For example, if a composition is described as containing components A, B, and/or C, the composition can contain A alone; B alone; C alone; A and B in combination; A and C in combination; B and C in combination; or A, B, and C in combination.

Referring now to FIGS. 1-3B, reference numeral 10 generally designates a vehicle. A license plate 14 is positioned on a rear of the vehicle 10. The license plate 14 includes an indicia 18 including a first persistent phosphorescent material. A light source 22 is positioned proximate the license plate 14. The light source 22 is configured to activate the first phosphorescent material. A license plate frame 26 at least partially surrounds the license plate 14. The license plate frame 26 includes an at least partially transparent substrate 30. The at least partially transparent substrate 30 includes a partially transmissive coating 34. A second persistent phosphorescent material is positioned proximate the partially transmissive coating 34. The license plate frame 26 also includes a reflective surface 38, and a transparent surface 42 positioned proximate the license plate 14.

Figure 1:
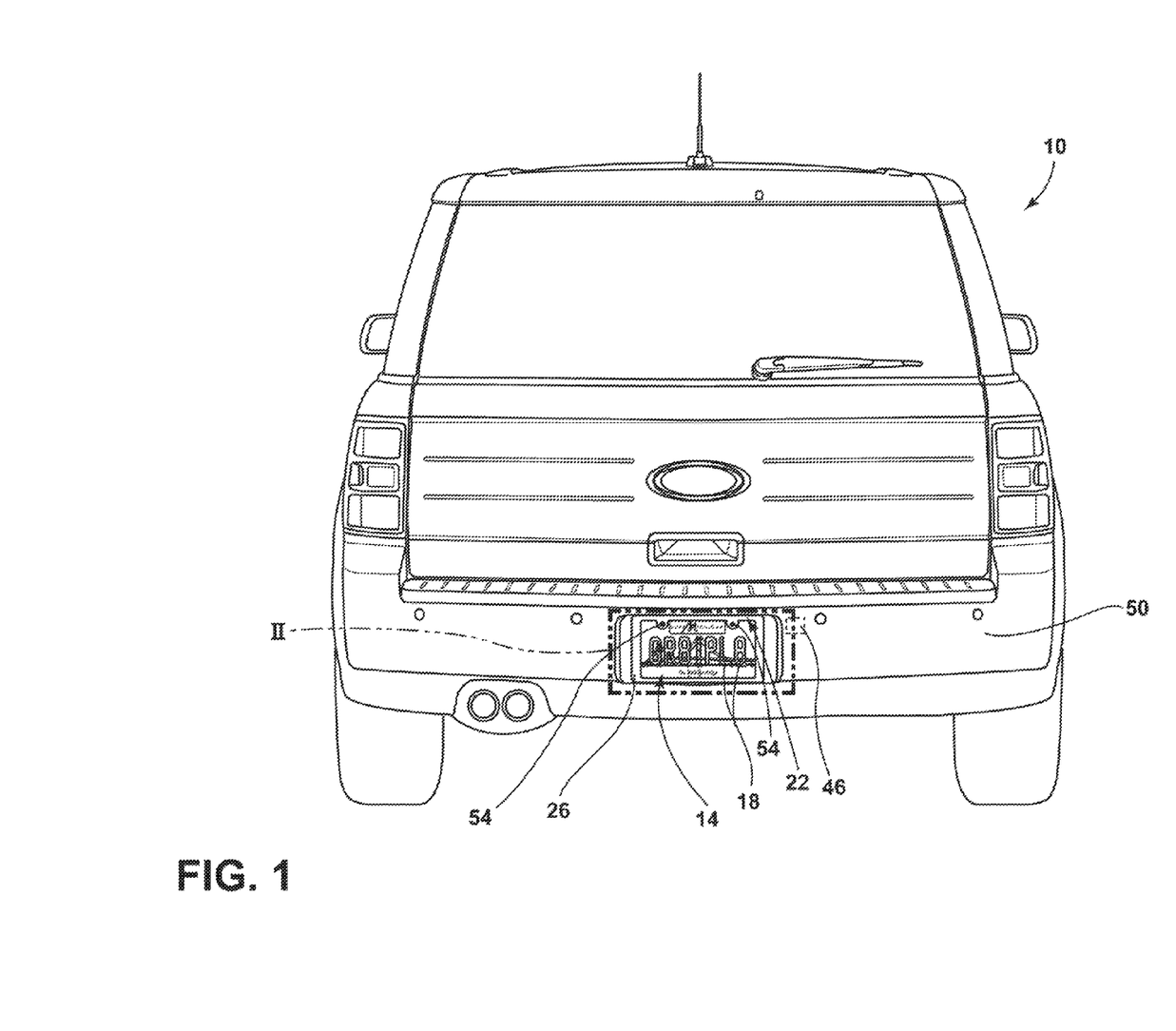
FIG. 1 is a rear view of a vehicle, according to one embodiment.

Referring now to FIG. 1, the license plate 14 and the license plate frame 26 are positioned on a bumper 50 of the vehicle 10. The bumper 50 may define a recessed area in which the license plate 14 and license plate frame 26 are positioned, or the license plate 14 and license plate frame 26 may be positioned on a surface of the bumper 50. Although depicted on a rear of the vehicle 10, it will be understood that the license plate 14 and the license plate frame 26 may equally be positioned on a front of the vehicle 10 without departing from the spirit of this disclosure. The license plate 14 and the license plate frame 26 may be positioned in a center of the bumper 50 or may be positioned on driver or passenger sides of the bumper 50. A plurality of fasteners 54 (e.g., screws or bolts) may be disposed through the license plate 14 and the license plate frame 26, such that the license plate 14 and the license plate frame 26 are secured to the bumper 50 of the vehicle 10. The license plate 14, as explained above, may include one or more indicia 18 disposed thereon. The indicia 18 may include text, numerals, and/or symbols, which may be used to designate an identification or registration of the vehicle 10.

Figure 2A:
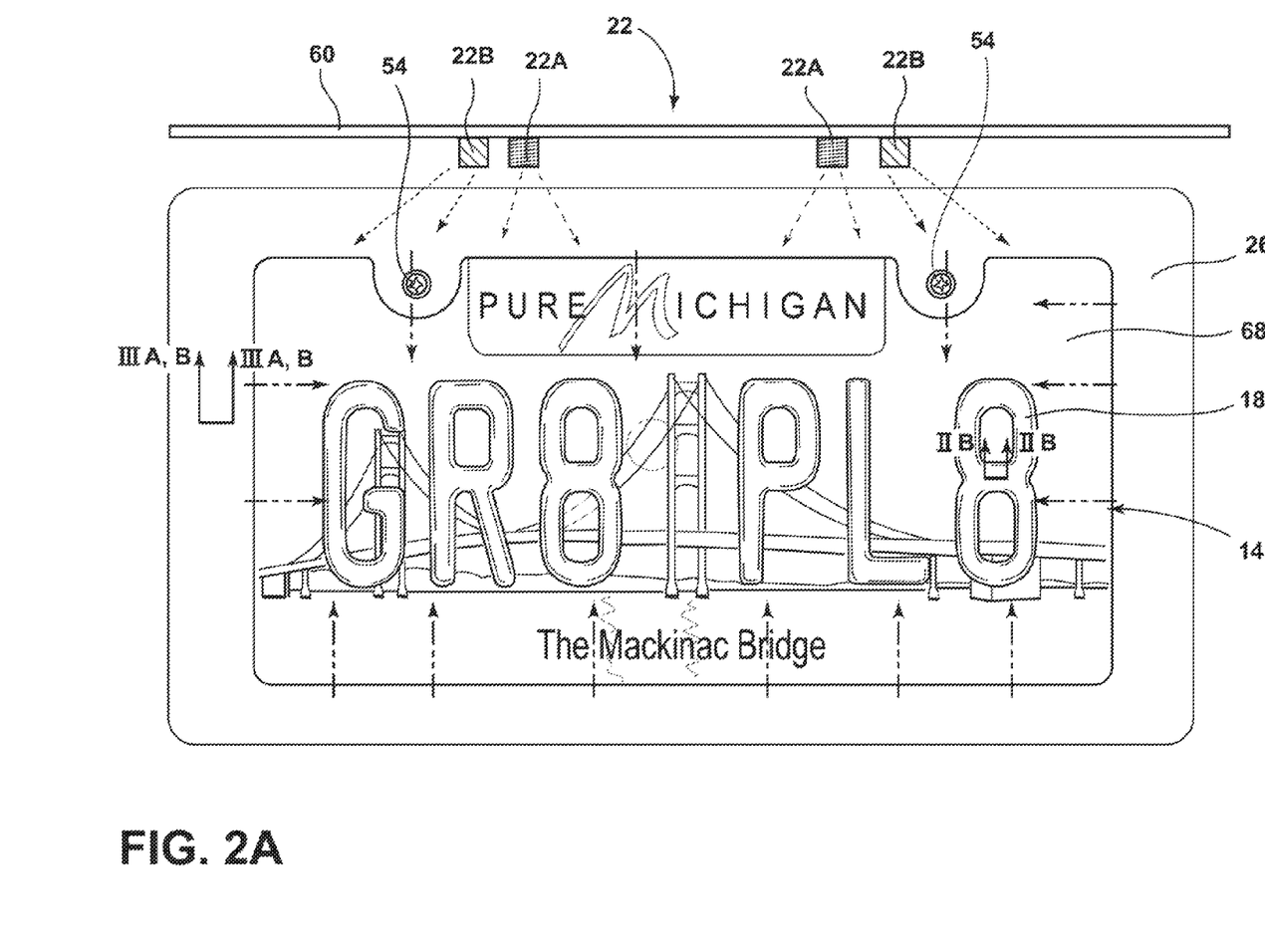
FIG. 2A is an enlarged view taken at section II of FIG. 1.

Referring now to FIG. 2, the license plate frame 26 may partially, substantially, or fully surround the license plate 14. Positioned above the license plate 14 and the license plate frame 26 is the light source 22. In the depicted example, the light source 22 may be positioned on a printed circuit board 60, or other suitable electrical support substrate. The light source 22 may include a plurality of light sources, such as light emitting diodes (LEDs) and/or incandescent bulbs. The light source 22 may be configured to emit colored, white, or nonvisible light. In the depicted embodiment, the light source 22 may include a set of low wavelength LEDs 22A and a set of white light LEDs 22B. The low wavelength LEDs 22A of the light source 22 may include ultra violet LEDs configured to emit light having a wavelength less than about 400 nm, or greater than about 10 nm (e.g., ultraviolet light). In other embodiments, the low wavelength LEDs 22A may be configured to emit light having a wavelength of between about 380 nm and about 500 nm (e.g., violet to blue light). Depending on the wavelength of light, the light emitted may be imperceptible to human eyes and therefore considered nonvisible. In various examples, the white LEDs 22B may have a cool white color temperature. For example, the color temperature of the white LEDs 22B may have a color temperature of greater than about 7,000 K, 8,000 K, 9,000 K or greater than about 10,000 K. In other words, the light of the white LEDs 22B may be configured to output a higher percentage of blue wavelength light than neutral white light or the binning of the white LEDs 22B may be skewed toward blue. The light source 22 is configured to emit light onto the license plate 14 and the license plate frame 26 such that the indicia 18 of the license plate 14 may be visible in low lighting conditions (e.g., dusk and/or night time).

The license plate 14 may include the indicia 18 as well as a background 68. The indicia 18 may be positioned on raised lettering of the license plate 14. For example, the license plate 14 may be composed of a metal and the indicia 18 may be stamped into the license plate 14, thereby causing the raised surface of the indicia 18. Positioned around the indicia 18 is the background 68. A paint may be applied to the indicia 18, and/or the background 68, to provide color or images to the license plate 14. The paint used on the indicia 18 and the background 68 of the license plate 14 may include at least one of a first phosphorescent material, a pigment, or a reflective and/or scattering agent. The pigments of the paint may be used to provide color or opacity to the paint.

Figure 2B:
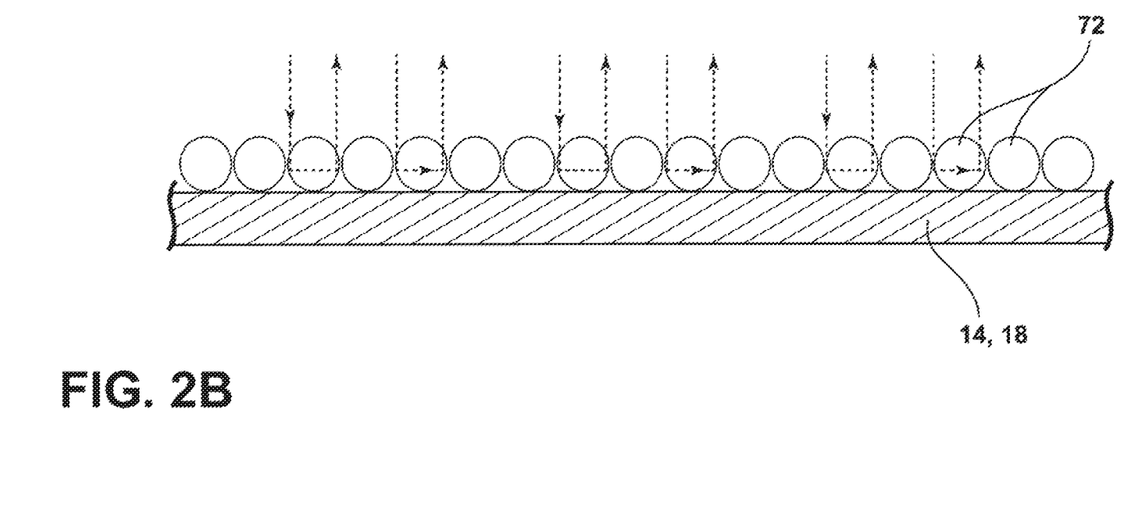
FIG. 2B is a cross-sectional view taken at line IIB-IIB of FIG. 2A.
Figure 3A:
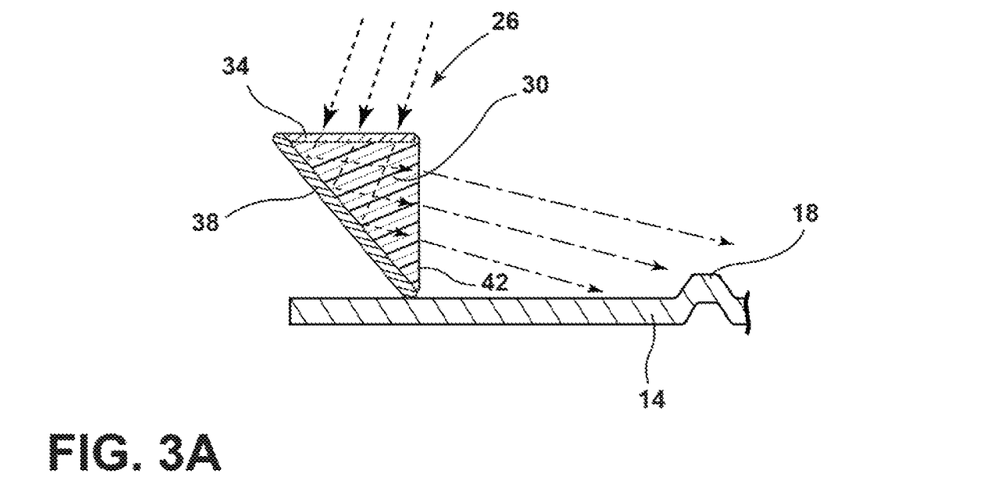
FIG. 3A is a cross-sectional view of a license plate frame taken at line IIIA-IIIA of FIG. 2, according to one embodiment.
Figure 3B:
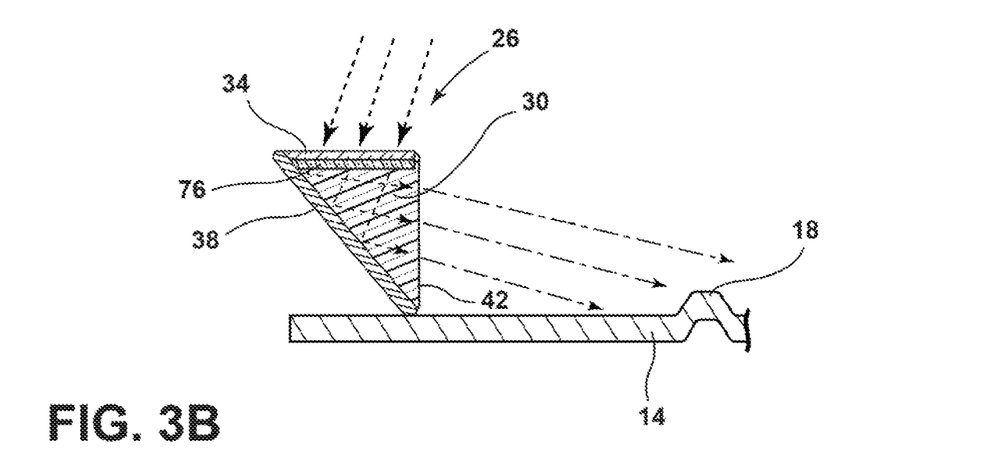
FIG. 3B is a cross-sectional view of the license plate frame taken at line IIIB-IIIB of FIG. 2, according to another embodiment.

According to one embodiment, the reflective and/or scattering agent within the paint of the license plate 14 is configured as a plurality of retroreflective beads 72. The beads 72 may be formed from a glass material, a polymeric material, and/or any other practicable material. In some embodiments, a portion of the beads 72 may be a first material (e.g., a glass) and a second portion of the beads 72 may be a second material (e.g., a polymeric material). The choice of the material of beads 72 may be dependent on where the paint is applied to the license plate 14 (e.g., either the indicia 18 or background 68). The beads 72 may have a solid construction, or may be hollow. In embodiments where the beads 72 have a hollow core, the internal void may include any type of material, solid, liquid, or gas, without departing from the teachings provided herein or the spirit of the disclosure. For example, the material within the beads 72 may have a different refractive index than the material of the beads 72. The beads 72 may have a substantially spherical shape, an oblong shape, an irregular shape, or combinations thereof. The beads 72 may range in size from about 60 μm (0.0024 inches) to about 850 μm (0.034 inches). The bead size may be expressed in terms of U.S. sieve number, or the size of mesh screen that a bead will pass through. For example, a U.S. Sieve Number 20 will permit beads with a diameter of 840 μm (0.033 inches) or less to pass through the mesh, whereas a Number 200 mesh will allow those beads of 74 μm (0.0029 inches) or less to pass. According to one embodiment, the beads 72 may be chosen from 20 to 200 U.S. Sieve Number. The beads 72, according to one embodiment, are substantially monodispersed in size and/or shape. According to an alternate embodiment, the beads 72 may be configured in a variety of sizes and/or shapes that are randomly distributed within the paint.

According to one embodiment, the paint of the license plate 14 may contain over 10, 100 or 1000 beads per square foot that are bonded to the license plate 14. The beads 72 and/or paint may be printed onto the license plate 14. The beads 72 may scatter and/or reflect the light incident on the beads 72 and redirect the light away from the license plate 14, thereby creating reflective characteristics. For the beads 72 to retroreflect light, the beads 72 may be partially transparent and substantially round. The beads 72 may also be configured to scatter a portion of the light emitted from the first phosphorescent material and/or a second phosphorescent material, as explained in greater detail below The transparency of the glass beads 72 may allow light, both ambient and otherwise, to pass into and be subsequently redirected out of the sphere. As the light ray enters the bead 72, it may be bent (refracted) by the rounded surface of the bead to a point below where the bead 72 is embedded in the paint of the indicia 18. The light striking the back of the bead surface, which is embedded within the paint, may then be reflected outwardly in a substantially convergent direction to which the light entered the bead 72.

The beads 72 may be applied to the license plate 14 or paint in a premixed solution. The beads 72 may be embedded in the paint greater than about 10%, 20%, 30%, 40%, 50% or 60% of the diameter of the bead 72. In other words, a portion of the beads 72 may protrude from the paint. It will be understood that multiple contiguous layers of beads may be utilized within the paint such that some beads 72 are completely surrounded by paint and beads while others protrude from the paint. The paint may serve as an adhesive for adhering the beads 72 to the license plate 14. The depth of the beads 72 within the paint may be consistent across the license plate 14 or may vary across the license plate 14, such that certain areas are highlighted. For example, the beads 72 in the paint applied to the indicia 18 may be deeper or shallower in the paint than the beads 72 in the background 68 to highlight the indicia 18.

The retroreflected light from the beads 72 may be a function of three variables including the index of refraction of the beads; the bead shape, size, and surface characteristics; and the number of beads 72 present and exposed to the light. The bead's Refractive Index (RI) is a function of the chemical makeup of the beads. The higher the RI, the more ambient light that is retroreflected. According to one embodiment, the beads 72 may have a refractive index in the range of 1 to 2.

Referring now to FIGS. 2A, 2B, 3A and 3B, positioned around the license plate 14 is the license plate frame 26. The license plate frame 26 may include the substrate 30 on which the partially transmissive coating 34, the reflective surface 38, and the transparent surface 42 are disposed. The transmissive coating 34 may be a coating configured to allow a portion of light (e.g., from the light source 22 and/or the sun) through to the substrate 30. The partially transmissive coating 34 may be a paint, or a metal, disposed on the substrate 30. For example, the partially transmissive coating 34 may include a metal film, a metal foil, and/or a vacuum metalized coating. According to various embodiments, the partially transmissive coating 34 may be configured to allow less than about 1% of light, less than about 5% of light, less than about 10% of light, less than about 20% of light, less than about 30% of light, less than about 40% of light, or less than about 50% of light impinging on the partially transmissive coating 34 to pass through to the substrate 30. The reflective surface 38 may include a metal film, a metal foil, a vacuum metallized coating and/or a light colored surface (e.g., from white paint), which is configured to reflect light through the substrate 30 and toward the transparent surface 42. The transparent surface 42 may simply be an uncoated surface of the substrate 30, or a partially transmissive surface (e.g., similar to the partially transmissive coating 34). The transparent surface 42 may be positioned on an inboard edge of the license plate frame 26. Additionally, the transparent surface 42 may include one or more optics (e.g., molded plastic from the substrate 30) configured to focus or spread light emitted from the substrate 30. For example, the transparent surface 42 may include optics which evenly spread light emitted from the substrate 30 over the license plate 14. In another example, the optics may be configured to focus the light onto the indicia 18. The license plate frame 26 may include the second phosphorescent material disposed within the substrate 30 (FIG. 3A) and/or forming a phosphorescent layer 76 between the substrate 30 and the partially transmissive coating 34.

Referring again to FIGS. 2A, 2B, 3A, and 3B, in examples where the substrate 30 includes the second phosphorescent material, the substrate 30 may be prepared by dispersing one or more persistent phosphorescent materials in a polymer matrix to form a homogenous mixture using a variety of methods. For example, the substrate 30 may be rendered by dispersing the phosphorescent materials into a solid state solution (homogenous mixture in a dry state) that may be incorporated in a polymer matrix formed by extrusion, injection molding, compression molding, calendaring, thermoforming, etc. In examples where the license plate frame 26 includes the phosphorescent layer 76 and where the license plate 14 includes a layer of the first photoluminescent material, the phosphorescent materials may include a binder (e.g., polymer) and be disposed on an exterior surface of the substrate 30, indicia 18 and/or background 68 and may be applied by painting, screen printing, flexography, spraying, slot coating, dip coating, roller coating, bar coating, and/or any other methods known in the art.

The persistent phosphorescent materials may be defined as being able to store an activation emission and release light gradually (i.e., a perceptible glow), for a period of several minutes or hours, once an activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent materials, according to at least one embodiment, may be operable to emit light at or above an intensity of 0.32 mcd/m$^2$ after a period of about 10 minutes. Additionally, the persistent phosphorescent materials may be operable to emit light above or at an intensity of 0.32 mcd/m$^2$ after a period greater than about 30 minutes, greater than about 60 minutes, greater than about 2 hours, greater than about 5 hours, greater than about 10 hours or greater than about 24 hours. Accordingly, the persistent phosphorescent materials may continually illuminate in response to excitation through a plurality of excitation sources emitting an activation emission, including, but not limited to, ambient light (e.g., the sun), light from the light source 22 (e.g., low wavelength LEDs 22A and/or the white LEDs 22B), light from the license plate frame 26, light sources proximate the vehicle 10 (e.g., light poles or parking garage lights) and/or any other light source disposed onboard or exterior to the vehicle 10. In some embodiments, the wavelength of light emitted by the second phosphorescent material of the license plate frame 26 may be used to charge the first phosphorescent material of the license plate 14.

The periodic absorption of the activation emission from the excitation sources may provide for a substantially sustained charge of the persistent phosphorescent materials to provide for a consistent passive illumination. For example, the light source 22 may be pulsed, or otherwise periodically be activated to charge the phosphorescent materials, such that the indicia 18, background 68 and/or license plate frame 26 provides a constant or changing level of emitted phosphorescent light. In some embodiments, the light sensor 46 (FIG. 1) may monitor the light illumination intensity of the phosphorescent material and initiate an excitation source (e.g., from the light source 22) when the illumination intensity falls below 0.32 mcd/m$^2$, or any other predefined intensity level (i.e., as long as there is sufficient battery charge). Additionally or alternatively, the light sensor 46 may monitor the intensity and amount of light falling on the license plate 14 and license plate frame 26 and initiate an excitation source (e.g., from the light source 22) when an insufficient amount of light to charge the first and second phosphorescent materials has been present for a predetermined time.

The persistent phosphorescent materials may correspond to alkaline earth aluminates and silicates, for example, doped disilicates, or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. The polymeric material of the substrate 30 may include between about 0.1% to about 25.0% of the second phosphorescent material either by weight or mole fraction. In embodiments utilizing the phosphorescent layer 76 on the substrate 30, the layer 76 may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof. The light emitted from the phosphorescent material, and thereby the license plate 14 and license plate frame 26, may be of a desired brightness such that the indicia 18 are visible. According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions. In embodiments where the background 68, but not the indicia 18, includes the phosphorescent material, the light emitted from the background 68 may be bright enough to draw a contrast to the indicia 18, such that the indicia 18 is perceptible. The first and second phosphorescent materials may be the same material, or may be configured to output different colors, intensities or have different lengths of persistence.

According to an alternate exemplary embodiment, 100 parts of a commercial solvent-borne polyurethane, such as Mace resin 107-268, having 50% solid polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane, may be blended to yield a low rare earth mineral phosphorescent structure or be used in the substrate 30. It will be understood that the compositions provided herein are non-limiting examples. Thus, any phosphor known in the art may be utilized for utilization as a phosphorescent material or structure without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the substrate 30, or paint of the indicia 18, and background 68 may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence). The photoluminescent material may be activated by the same or a different activation emission as the persistent phosphorescent materials.

Use of the present disclosure may offer several advantages. For example, use of the phosphorescent material within the license plate frame 26, and on the license plate 14, may allow for the indicia 18 of the license plate 14 to be visible for a long period of time (e.g., greater than about ten minutes, greater than about one hour, greater than about ten hours) with the use of little or no energy. The indicia 18 may be visible due to either the illumination from the first phosphorescent material or due to the edge lighting provided by the license plate frame 26. Additionally, use of the reflective and/or scattering agent in the paint of the license plate 14 may provide greater reflectivity thereby increasing the safety and visibility of the vehicle 10. Further, use of the license plate frame 26 may provide for an aesthetically pleasing edge lighting of the license plate 14 which may offer colored illumination. Even further, use of the sensor 46 (FIG. 1) allows for the vehicle 10 to determine whether or not a desired illumination of the phosphorescent materials on the license plate 14 and in the license plate frame 26 is being achieved.

It will be understood that the foregoing disclosure may equally be applied to frames of all kinds including, but not limited to, window frames, picture frames, TV frames, mirror frames, etc., without departing from the scope of this disclosure. Further, sacrificial panels (e.g., panels configured to be replaced after minor fender benders) located on the rear of the vehicle 10 may also incorporate built in light sources configured to charge the license plate frame 26 and/or the license plate 14.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A vehicle, comprising:
    a license plate positioned on a rear of the vehicle, the license plate including an indicia comprising a first phosphorescent material;
    a light source configured to activate the first phosphorescent material; and
    a license plate frame at least partially surrounding the license plate, the license plate frame comprising:
        an at least partially transparent substrate comprising a partially transmissive coating;
        a second phosphorescent material positioned proximate the partially transmissive coating;
        a reflective surface; and
        a transparent surface positioned proximate the license plate.

2. The vehicle of claim 1, wherein the light source is configured to emit light with a wavelength shorter than about 425 nm.

3. The vehicle of claim 2, wherein a second phosphorescent material is positioned between the partially transmissive coating and the substrate.

4. The vehicle of claim 2, wherein the second phosphorescent material is molded into the substrate and the light source is configured to activate the second phosphorescent material.

5. The vehicle of claim 1, further comprising:
    a second light source configured to emit white light.

6. The vehicle of claim 5, wherein the second light source has a color temperature between about 7,000K and about 10,000K.

7. The vehicle of claim 1, wherein at least one of a first and a second phosphorescent material are configured to have a perceptible glow for greater than 10 hours after charging.

8. The vehicle of claim 7, further comprising:
a light sensor positioned proximate the license plate, wherein the light sensor is configured to sense an amount of light falling on the license plate and the license plate frame.

9. The vehicle of claim 1, wherein the indicia comprises a plurality of beads.

10. A vehicle, comprising:
a light sensor configured to determine the amount of light impinging on a license plate; and
a license plate frame positioned proximate the license plate, the license plate frame comprising:
a substrate comprising a partially transmissive surface;
a phosphorescent material disposed within the substrate;
a reflective surface positioned on the substrate; and
a transparent surface positioned proximate the license plate, the transparent surface configured to edge illuminate the license plate.

11. The vehicle of claim 10, wherein the phosphorescent material is configured to have a perceptible glow for greater than 10 hours after charging.

12. The vehicle of claim 10, wherein the license plate frame fully surrounds the license plate.

13. The vehicle of claim 10, wherein the partially transmissive surface comprises a metal.

14. The vehicle of claim 13, wherein the reflective surface comprises a metal.

15. The vehicle of claim 14, wherein the license plate frame at least partially surrounds the license plate.

16. A frame for a license plate, comprising:
a light sensor configured to determine an amount of light impinging on the license plate;
a substrate comprising an at least semi-transparent polymeric material having a phosphorescent material disposed therein;
a partially transmissive coating and a reflective coating each on at least a portion of the substrate; and
a transparent surface of the substrate, wherein the transparent surface is positioned on an inboard edge of the substrate.

17. The frame of claim 16, wherein the reflective coating is configured to reflect light through the substrate.

18. The frame of claim 17, wherein the partially transmissive coating, reflective coating, and the transparent surface cooperate to surround the substrate.

19. The frame of claim 16, wherein the reflective coating includes a white paint.

* * * * *